United States Patent [19]

Benda et al.

[11] 4,282,132

[45] Aug. 4, 1981

[54] LUBRICATING OIL ADDITIVES

[75] Inventors: Rainer Benda, Rossdorf; Helmuth Knoell, Lautertal; Peter Neudoerfl; Horst Pennewiss, both of Darmstadt-Neu-Kranichstein, all of Fed. Rep. of Germany

[73] Assignee: Röhm GmbH, Darmstadt, Fed. Rep. of Germany

[21] Appl. No.: 63,682

[22] Filed: Aug. 6, 1979

[30] Foreign Application Priority Data

Aug. 11, 1978 [DE] Fed. Rep. of Germany ....... 2835192

[51] Int. Cl.$^3$ .................. C10M 1/32; C10M 3/26; C10M 5/20; C10M 7/30
[52] U.S. Cl. .................. 260/30.2; 252/51.5 R; 252/51.5 A; 260/31.2 N; 260/32.4; 260/32.6 A; 260/33.6 AQ; 525/279; 525/280; 525/282
[58] Field of Search ............... 525/279, 280, 281, 282; 252/51.5 R, 51.5 A; 260/33.6 AQ, 32.4, 30.2, 32.6 A, 31.2 N

[56] References Cited

U.S. PATENT DOCUMENTS

| | | | |
|---|---|---|---|
| 3,775,329 | 11/1973 | Eckert | 252/59 |
| 4,033,888 | 5/1977 | Kiovsky | 252/56 D |
| 4,085,055 | 4/1978 | Durand et al. | 525/281 |
| 4,145,298 | 3/1979 | Trepka | 252/51.5 R |
| 4,146,489 | 3/1979 | Stambaugh | 2 52/51.5 R |
| 4,187,202 | 2/1980 | Kondo et al. | 525/281 |
| 4,229,311 | 10/1980 | Wenzel et al. | 260/30.2 |

FOREIGN PATENT DOCUMENTS

| | | |
|---|---|---|
| 2156122 | 5/1972 | Fed. Rep. of Germany . |
| 2634033 | 2/1977 | Fed. Rep. of Germany . |
| 2603034 | 8/1977 | Fed. Rep. of Germany . |
| 2554117 | 2/1978 | Fed. Rep. of Germany . |
| 2746547 | 4/1978 | Fed. Rep. of Germany . |
| 53-39305 | 4/1978 | Japan . |
| 1139569 | 1/1969 | United Kingdom ............ 252/51.5 R |

*Primary Examiner*—William F. Hamrock
*Attorney, Agent, or Firm*—Curtis, Morris & Safford

[57] ABSTRACT

What is disclosed is a method for making a lubricating oil additive which comprises a first step of graft copolymerizing an alkyl ester of acrylic acid or of methacrylic acid, alone or in combination with styrene, onto a backbone copolymer which is hydrogenated block copolymer of styrene and a conjugated diene having 4 to 6 carbon atoms to form a first graft copolymer, and a second step of graft copolymerizing a polymerizable heterocyclic monomer, alone or in combination with a hydrophobizing vinyl ester, onto said first graft copolymer to form a second graft copolymer, and the lubricating oil additive so made.

14 Claims, No Drawings

LUBRICATING OIL ADDITIVES

The present invention relates to methods for the preparation of lubricating oil additives comprising polyalkyl methacrylates and hydrogenated block copolymers comprising a conjugated diene having 4 to 6 carbon atoms, particularly 1,3-butadiene or isoprene, and styrene, and to the lubricating oil additives so obtained.

Technology has successfully concerned itself with the development of lubricating oil additives which improve the viscosity index of lubricating oils and additionally have good thickening, dispersing, and detergents effects together with a good protective effect against wear. Further critical points are the effect on the pour point as well as the shear stability of the lubricating oil additives. At the same time, mixtures thereof with mineral oils must give stable systems.

As such additives, the prior art has recommended graft copolymers which are prepared by the grafting of nitrogen-containing monomers onto a polymeric substrate. The polymeric substrates can be, for example, copolymers of ethylene and propylene, copolymers or terpolymers of ethylene/propylene and a diene, hydrogenated styrene-butadiene copolymers and hydrogenated styrene-isoprene copolymers, or atactic polypropylene or polyethylene of low density.

Still other prior art teaches lubricating oil additives which are formed by the graft copolymerization of polymerizable vinyl monomers onto a hydrogenated polymer or copolymer such as homopolymers of conjugated dienes having 4 to 6 carbon atoms, or hydrogenated copolymers of at least two conjugated dienes having 4 to 6 carbon atoms, or hydrogenated copolymers of a conjugated diene having 4 to 6 carbon atoms and styrene. As polymerizable vinyl derivatives, various (meth)acrylic acid esters, diethylaminoethyl acrylate, and also N-vinyl pyrrolidone, N-vinyl imidazole, and N-vinyl pyridine are mentioned in addition to vinyl acetate. As exemplified in the prior art, the grafting is carried out in about a 10 percent solution of the polymer in mineral oil. The monomers to be grafted can be used alone or in admixture, for example as mixtures of N-vinyl imidazole or of N-vinyl pyrrolidone with the (meth)acrylate.

However, lubricating oil additives of the state of the art cannot completely satisfy technical requirements. For example, the grafting yield leaves something to be desired. For this reason the dispersing/detergent effect of the additives is not significantly improved, in comparison with the nitrogen-free base polymer, in Otto motors and hot and/or loaded Diesel motors.

It has now been found that lubricating oil additives having outstanding properties are obtained if, in a first stage, styrene and alkyl esters of (meth)acrylic acid, or such esters alone, are polymerized in mineral oil in the presence of a backbone polymer which is a hydrogenated block copolymer of a conjugated diene having 4 to 6 carbon atoms, on the one hand, and of styrene, on the other hand, and, in a second stage, a hydrophobizing vinyl ester and a polymerizable heterocyclic monomer, or a heterocyclic monomer alone, are graft copolymerized onto this product.

The hydrogenated block polymers to be used as a base or backbone polymer according to the invention are known, for example from German Offenlegungsschrift No. 2,156,122 incorporated herein by reference. They are prepared, for example, by copolymerization of a conjugated diene and styrene in a hydrocarbon solvent at a temperature from $-50°$ C. to $150°$ C. in the presence of an alkali metal or alkali metal compound as a catalyst. Lithium and its compounds, particularly lithium hydrocarbyl compounds, are preferred. The polymers suitably comprise 40 to 95 percent by weight of diene and 60 to 5 percent by weight of styrene. They are partially or completely hydrogenated, with or without prior isolation, using catalysts containing compounds of copper or molybdenum, noble metals or noble metal compounds, or iron, cobalt, or nickel or compounds thereof. Preferably, hydrogenated block copolymers of butadiene, or of 2-methyl-1,3-butadiene (isoprene), and styrene are used.

The hydrogenated block copolymers as a rule have an average molecular weight of $1(10^4)$ to $3(10^5)$, preferably $3(10^4)$ to $1(10^5)$, and are in general hydrogenated until there is a residual content of olefinic double bonds of less than 15 percent, preferably less than 5 percent.

The alkyl esters of (meth)acrylic acid which are to be polymerized in the first stage include compounds of the general formula (I)

wherein $R_1$ is hydrogen or methyl and $R_2$ is alkyl having 1 to 22 carbon atoms, preferably those compounds wherein $R_1$ is methyl and $R_2$ is alkyl having 8 to 12 carbon atoms. Decyl, lauryl, palmityl, cetyl, and stearyl groups or mixtures thereof are particularly mentioned as such alkyl groups.

At the same time, styrene or α-methyl styrene can be copolymerized together with the esters of (meth)acrylic acid. The ratio by weight of styrene or of α-methyl styrene to the alkyl esters of (meth)acrylic acid can be from 1:1.5 to 1:9. In the first stage, in addition to the (meth)acrylic acid esters of formula (I) given above, esters substituted by amino groups and having the following general formula (II)

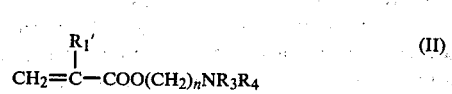

can optionally be used, wherein $R_1'$ is hydrogen or methyl, $R_3$ and $R_4$ are hydrogen or alkyl having 1 to 4 carbon atoms, and n is a number from 2 to 4, preferably those compounds wherein $R_3$ and $R_4$ are methyl or ethyl and n is 2.

In this case, the weight ratio between the monomers of general formula (I) and of general formula II can be from 1:0.01 to 1:0.2, preferably 1:0.1. In the following quantitative disclosures, the weights of the compounds of general formulas (I) and (II) are combined.

In the second stage, in addition to polymerizable heterocyclic monomers, optionally hydrophobizing vinyl esters of the general formula (III)

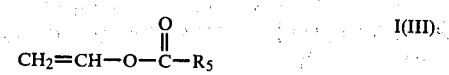

can still be introduced, wherein $R_5$ is alkyl having 6 to 20 carbon atoms. $R_5$ preferably is a highly-branched alkyl having $C_9$-, $C_{10}$-, or $C_{11}$-side chains, providing in this case that the carboxyl group is present on a tertiary carbon atom.

As representatives of compounds of general formula (III), those esters derived from the commercially-available products which are designated by the tradename "Versatic acids" can be especially mentioned.

The weight ratio of the monomers of the last-mentioned general formula to the polymerizable heterocyclic monomers can be, for example, from 1:0.1 to 1:3.

The polymerizable heterocyclic compounds which are polymerized in the second stage according to the invention include, in the first instance, N-vinyl-pyrrolidone-2 and N-vinyl imidazole, or a mixture thereof in a weight ratio of about 1:1 to 9:1, preferably about 3:1.

The base or backbone polymer in general makes up from 5 to 50 percent by weight of the final graft copolymer, while the monomers of the aforementioned general formulas, or of styrene and α-methyl styrene, which are to be polymerized in the first stage, make up from 49.5 to 85 percent by weight of the final copolymer product. The polymerizable heterocyclic monomers which are subsequently graft copolymerized in a second stage onto the product of the first stage make up from 0.5 to 10 percent by weight of the final copolymer.

Preferably, the polymerization in the first and second steps already take place in a medium suitable for use as a lubricant, for example in a mineral oil suitably having a viscosity from 3-6 mm$^2$/s at 100° C.

The polymerization steps can be carried out technically with reference to already-known methods [cf. J. Pavlinec et al., J. Polymer Sc., Part C, No. 16, pages 1113-1123 (1967)].

For example, the polymerization can be carried out free-radically using suitable polymerization initiators such as, for example per-compounds, particularly per-acid esters. The amount of initiators sufficient in a given case is known in the art.

For carrying out the process according to the invention, a mixture of the block copolymer to be hydrogenated can be introduced into the usual apparatus, optionally together with styrene and a certain portion of the monomers which are to be polymerized in the first stage, for example about 1/5 of the monomers, in a solvent system suitable for carrying out the polymerization method to be used, preferably in a medium such as mineral oil which is suitable for use as a lubricant, together with a portion of the initiator. After solution is complete, a mixture of the remaining monomers to be polymerized in the first stage, plus initiator, can be uniformly added with stirring over a certain period of time which is influenced by the size of the batch, for example over 3 or 4 hours, while warming the batch to reaction temperature, in general above 80° C., preferably about 90° C. A certain time after the addition is concluded, about 2 hours later, a certain amount of initiator can still be post-added. The amount of initiator initially present, the amount of initiator added together with the monomer, and the amount of initiator which is post-added can stand in an approximate ratio of 2:3:1.

After a total polymerization time of, generally, less than 10 hours, for example about 8 hours, the monomers which are to be polymerized in the second stage, such as polymerizable heterocyclic compounds or a mixture thereof, as well as any optional hydrophobizing vinyl esters of the general formula (III), and a sufficient amount of initiator are added, the initiator as a rule being different from that used in the first stage.

Grafting then follows at temperatures above those used in the first step, for example at 130° C. At preferably-regular time intervals, each of about an hour, further amounts of initiator can be post-added, for example in each case half of the initiator amount first introduced, for a total of 4 additions. The grafting process can as a rule be considered terminated about two hours after addition of the last initiator.

The lubricating oil additives prepared according to the invention are very well compatible with the most-different mineral lubricating oils, such as hydro-refined oils or oils refined in solvents, as well as with the most different synthetic lubricants, and form stable solution systems with these synthetic lubricants and the mineral oils. In addition to their improved viscosity index-improving effect, the additives are characterized particularly by their advantageous low temperature viscosity behavior, by a pronounced dispersing effect or detergent effect, and particularly by an advantageous relationship between their thickening effect and shear stability. The good pour point effect of the additives prepared according to the present invention is also to be emphasized.

A better understanding of the present invention and of its many advantages will be had by referring to the following specific Examples, given by way of illustration.

EXAMPLE 1

The following mixture was introduced into a 1.5 liter four-necked round flask equipped with a stirrer, thermometer, reflux condenser, and dosing means:

574.5 g of mineral oil ($\eta$100° C.=5.3 mm$^2$/s)
63.8 g of a hydrogenated isoprene-styrene-block copolymer (46% styrene)
28.0 g of styrene
42.0 g of a methacrylic acid ester of a $C_{12-18}$-alcohol mixture and
1.12 g of tert.-butyl peroctoate.

After the components are dissolved, the following mixture is uniformly added at 90° C. over a time interval of 3.5 hours:

166.6 g of styrene
174.9 g of a methacrylic acid ester of a $C_{12-18}$ alcohol mixture and
1.75 g of tert.-butyl peroctoate.

Two hours after the material has been added, 0.58 g of tert.-butyl peroctoate is added. The total polymerization time is 8 hours. Thereafter, the following mixture is added:

13.2 g of vinyl pyrrolidone
4.4 g of vinyl imidazole
21.9 g of a vinyl ester of a highly branched $C_{10}$-monocarboxylic acid and
1.2 g of tert.-butyl perbenzoate.

Grafting then follows at 130° C. during which, in each case after 1, 2, 3, and 4 hours, a further 0.56 g of tert.-butyl perbenzoate is added. After a further two hours, grafting is concluded.

The solution obtained comprises 43.6 percent solids in mineral oil and is slightly cloudy. A 10 percent solution in the same mineral oil (having a viscosity of 5.3 mm$^2$/s at 100° C.) has a viscosity of 13.93 mm$^2$/s at 100° C. and a shear stability index (shear stability index=the loss in thickening effect, in percent, in a test of shear stability according to DIN 51 382) of 19. The nitrogen content of the isolated polymer is 0.38 percent.

EXAMPLE 2

The polymerization process is as in Example 1.
Present in the flask:
- 550.0 g of mineral oil ($\eta 100°$ C. = 5.3 mm$^2$/s)
- 137.5 g of hydrogenated butadiene-styrene block copolymer (55% styrene)
- 71.9 g of a methacrylic acid ester of a $C_{12-18}$ alcohol mixture
- 3.8 g of methyl methacrylate
- 0.92 g of tert.-butyl peroctoate.

Added to the flask:
- 231.6 g of a methacrylic acid ester of a $C_{12-18}$ alcohol mixture
- 12.2 g of methyl methacrylate
- 1.4 g of tert.-butyl peroctoate.

Grafting:
- 14.2 g of vinyl pyrrolidone
- 4.7 g of vinyl imidazole and
- 1.2 g of tert.-butyl perbenzoate Polymer content of the solution: 46.5 percent; Viscosity (100° C./10%): 14.1 mm$^2$/s; Shear stability index: 12; Nitrogen content of the isolated polymer: 0.36 percent.

EXAMPLE 3

Polymerization process is as in Example 1.
Present in the flask:
- 574.5 g of a mineral oil ($\eta 100°$ C. = 5.3 mm$^2$/s)
- 63.8 g of a hydrogenated isoprene-styrene block copolymer (46% styrene)
- 63.2 g of a methacrylic acid ester of a $C_{12-18}$ alcohol mixture
- 3.3 g of 2-dimethylaminoethyl methacrylate
- 5.5 g of methyl methacrylate and
- 1.12 g of tert.-butyl peroctoate.

Added to the flask:
- 268.2 g of a methacrylic acid ester of a $C_{12-18}$ alcohol mixture
- 8.75 g of 2-dimethylaminoethyl methacrylate
- 14.6 g of methyl methacrylate and
- 1.75 g of tert.-butyl peroctoate.

Grafting:
- 13.2 g of vinyl pyrrolidone
- 4.4 g of vinyl imidazole
- 21.9 g of vinyl ester of a highly-branched $C_{10}$-mono-carboxylic acid and
- 1.2 g of tertiary butyl perbenzoate Polymer content of the solution: 43.5 percent; Viscosity (100° C./10%): 12.8 mm$^2$/s; Shear stability index: 13; Nitrogen content of the isolated polymer: 0.65 percent.

What is claimed is:

1. A method for making a lubricating oil additive which comprises a first step of free-radically graft copolymerizing an alkyl ester of acrylic acid or of methacrylic acid, alone or in combination with styrene in a weight ratio of styrene to esters of 1:15 to 1:9, onto a backbone copolymer which is a hydrogenated block copolymer of styrene and a conjugated diene having 4 to 6 carbon atoms and a residual content of olefinic double bonds of less than 15 percent, in a medium suitable for use as a lubricant, to form a first graft copolymer, and a second step of free-radically graft copolymerizing at least one N-heterocyclic monomer selected from the group consisting of N-vinyl-pyrrolidone-2 and N-vinyl-imidazole, alone or in combination with a hydrophobizing vinyl ester in a weight ratio of ester to said N-heterocyclic monomer of 1:0.1 to 1:3, onto said first graft copolymer, in a medium suitable for use as a lubricant, to form a second graft copolymer comprising 5 to 50 percent by weight of said hydrogenated block copolymer, from 49.5 to 85 percent by weight of monomers graft copolymerized in said first step, and from 0.5 to 10 percent by weight of monomers graft copolymerized in said second step.

2. A method as in claim 1 wherein, in said first step, an aminoalkyl ester of acrylic acid or of methacrylic acid is graft copolymerized onto said backbone copolymer together with said alkyl ester of acrylic acid or of methacrylic acid.

3. A method as in claim 1 wherein said alkyl ester has the formula

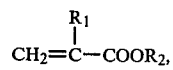

wherein $R_1$ is hydrogen or methyl and $R_2$ is alkyl having 1 to 22 carbon atoms.

4. A method as in claim 2 wherein said aminoalkyl ester has the formula

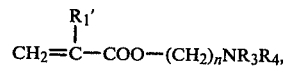

wherein $R_1'$ is hydrogen or methyl, $R_3$ and $R_4$ are hydrogen or alkyl having 1 to 4 carbon atoms, and n is an integer from 2 to 4.

5. A method as in claim 4 where $R_3$ and $R_4$ are methyl or ethyl and n is 2.

6. A method as in claim 1 wherein said N-heterocyclic monomer is a mixture of N-vinylpyrrolidone and N-vinylimidazole in a weight ratio from about 1:1 to 9:1.

7. A method for making a lubricating oil additive as in claim 1 wherein an alkyl ester of acrylic acid or of methacrylic acid is graft copolymerized in combination with styrene, in a first step, onto a backbone copolymer which is a hydrogenated block copolymer of styrene and a conjugated diene having 4 to 6 carbon atoms to form a first graft copolymer, and then graft copolymerizing N-vinyl-pyrrolidone-2 in a second step onto said first graft copolymer to form a second graft copolymer.

8. A method as in claim 1 wherein, in said second step, a hydrophobizing vinyl ester of the formula

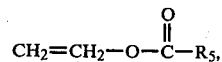

wherein $R_5$ is alkyl having 6 to 20 carbon atoms, is graft copolymerized with said heterocyclic compound.

9. A method as in claim 8 wherein $R_5$ is highly-branched alkyl having $C_9$-, $C_{10}$-, or $C_{11}$-side chains, which alkyl is bound to the carbonyl group of the formula by a tertiary carbon atom.

10. A lubricating oil additive prepared by the method of claim 1.

11. A lubricating oil additive prepared by the method of claim 2.

12. A lubricating oil additive prepared by the method of claim 8.

13. A lubricating oil additive prepared by the method of claim 9.

14. A lubricating oil additive prepared by the method of claim 7.

* * * * *